United States Patent
Nakagawa et al.

(10) Patent No.: US 9,464,877 B2
(45) Date of Patent: Oct. 11, 2016

(54) SHAPE MEASURING APPARATUS AND SHAPE MEASUREMENT ERROR CORRECTION METHOD

(71) Applicant: MITUTOYO CORPORATION, Kanagawa (JP)

(72) Inventors: Hideyuki Nakagawa, Tsukuba (JP); Nobuhiro Ishikawa, Ushiku (JP)

(73) Assignee: MITUTOYO CORPORATION, Kanagawa (JP)

(*) Notice: Subject to any disclaimer, the term of this patent is extended or adjusted under 35 U.S.C. 154(b) by 135 days.

(21) Appl. No.: 14/617,135

(22) Filed: Feb. 9, 2015

(65) Prior Publication Data

US 2015/0233692 A1    Aug. 20, 2015

(30) Foreign Application Priority Data

Feb. 19, 2014  (JP) .................. 2014-029802

(51) Int. Cl.
*G01B 5/008* (2006.01)
*G01B 5/016* (2006.01)

(52) U.S. Cl.
CPC ............. *G01B 5/008* (2013.01); *G01B 5/016* (2013.01)

(58) Field of Classification Search
CPC ............................ G01B 5/008; G01B 5/004
USPC .................................... 33/502, 503
See application file for complete search history.

(56) References Cited

U.S. PATENT DOCUMENTS

| | | | |
|---|---|---|---|
| 4,611,156 A | 9/1986 | Feichtinger | |
| 2005/0263727 A1* | 12/2005 | Noda | G01B 5/008 250/559.29 |
| 2007/0271803 A1 | 11/2007 | Ishikawa | |
| 2009/0287444 A1* | 11/2009 | Ishikawa | G01B 21/045 702/95 |
| 2010/0174504 A1* | 7/2010 | Nakagawa | G01B 21/045 702/95 |
| 2012/0017453 A1* | 1/2012 | Ogihara | G01B 21/045 33/503 |
| 2012/0055037 A1* | 3/2012 | Kumagai | G01B 21/047 33/503 |
| 2014/0059872 A1 | 3/2014 | Nakagawa et al. | |
| 2014/0130362 A1 | 5/2014 | Ishikawa et al. | |
| 2014/0232855 A1* | 8/2014 | Yamagata | G01B 11/007 348/135 |
| 2015/0241194 A1* | 8/2015 | Nakagawa | G01B 21/045 702/95 |
| 2016/0131470 A1* | 5/2016 | Ishikawa | G01B 21/045 33/503 |
| 2016/0178362 A1* | 6/2016 | Iseli | G01B 5/008 33/503 |

FOREIGN PATENT DOCUMENTS

| | | |
|---|---|---|
| DE | 3336854 | 5/1985 |
| EP | 1862761 | 12/2007 |
| EP | 2120008 | 11/2009 |
| JP | 2007-315897 | 12/2007 |

OTHER PUBLICATIONS

Search Report issued in EPO, Patent Application No. 15155229.6, dated Jul. 22, 2015.

* cited by examiner

*Primary Examiner* — G. Bradley Bennett
(74) *Attorney, Agent, or Firm* — Greenblum & Bernstein, P.L.C.

(57) ABSTRACT

A calculator includes a first filter, a second filter, and an adding device. The first filter outputs, as a first corrected value, a value in which displacement of a displacement table detected by a scale has been corrected based on first frequency transfer characteristics from a scale to a measured object station. The second filter outputs, as a second corrected value, a value in which the first corrected value is corrected based on second frequency transfer characteristics from a ball tip to a ball tip displacement detector. The adding device adds the second corrected value and displacement of the ball tip detected by the ball tip displacement detector to calculate a measured value.

15 Claims, 8 Drawing Sheets

RELATED ART

SHAPE MEASURING APPARATUS AND SHAPE MEASUREMENT ERROR CORRECTION METHOD

CROSS-REFERENCE TO RELATED APPLICATIONS

The present application claims priority under 35 U.S.C. §119 of Japanese Application No. 2014-029802, filed on Feb. 19, 2014, the disclosure of which is expressly incorporated by reference herein in its entirety.

BACKGROUND OF THE INVENTION

1. Field of the Invention

The present invention relates to a shape measuring apparatus, such as a coordinate measuring device, and to a shape measurement error correction method using the shape measuring apparatus.

2. Description of Related Art

Nowadays, in order to test accuracy of processing on a manufactured item having a three-dimensional shape, for example, a shape measurer such as a coordinate measuring device is used. A coordinate measuring device of this kind performs shape measurement by, for example, displacing a stylus tip of a scanning probe along the three-dimensional shape.

In a case where such a coordinate measuring device is used to perform measurement with a scanning probe, a measurement error may occur due to an effect accompanying movement of a slider to which the scanning probe is mounted. For example, when circle measurement is performed with the scanning probe, a motion error called "quadrant projection" occurs. "Quadrant projection" is a motion error forming projecting shapes when mechanically switching between quadrants of rectangular coordinates in the coordinate measuring device (when reversing a movement direction of each axis) in a case where the stylus tip of the scanning probe is performing circle measurement. Such quadrant projection occurs primarily due to backlash or the like caused by a mechanical structure of a measuring device.

FIG. 9 illustrates measurement results for a case where shape measurement is performed on a ring gauge (a ring-shaped measured object) using a generic coordinate measuring device. As shown in FIG. 9, peak-shaped measurement errors are observed in the measurement waveform at a border region P1 between a first quadrant and a fourth quadrant, as well as at a border region P2 between a second quadrant and a third quadrant. These are measurement errors caused by quadrant projection occurring due to backlash or the like when reversing the movement of the scanning probe in an X axis direction. Similarly, peak-shaped measurement errors are observed at a border region P3 between the first quadrant and the second quadrant, as well as at a border region P4 between the third quadrant and the fourth quadrant. These are measurement errors caused by quadrant projection occurring due to backlash or the like when reversing the movement of the scanning probe in a Y axis direction.

Meanwhile, an exemplary method of correcting scanning probe measurement error is described in Japanese Patent Laid-open Publication No. 2007-315897. According to this disclosure, a position of a forefront end of a slider is estimated using a correction filter based on frequency transfer characteristics between a scale and the forefront end of the slider. In addition, a measurement error occurring due to quadrant projection can be corrected by adding the estimated value to a scanning probe detected value and calculating a measured value.

In the coordinate measuring device described in Japanese Patent Laid-open Publication No. 2007-315897, a stage is provided on an anti-vibration table and an upper surface of the stage is made horizontal. A Y axis drive mechanism extending in the Y axis direction is installed at one X-axis-direction end of the stage. A beam support body is provided upright on top of the Y axis drive mechanism, and the beam support body can be driven in the Y direction by the Y axis drive mechanism. In addition, a beam is attached to a top end of the beam support body, the beam extending in a horizontal direction and in the X axis direction. A column is driven in the X axis direction along the beam. Furthermore, a slider is attached to the column so as to be drivable in a Z axis direction, and a scanning probe is mounted to a forefront end of the slider. In a coordinate measuring device having the above-noted configuration, a measured object (i.e. an object to be measured) is placed on the immobile stage and, in a state where the measured object is not expected to move, measurement of the measured object is performed by the scanning probe. In such a measuring apparatus, correction is performed by a calculator predicated on the freely displacing slider which has the scanning probe mounted on the forefront end thereof. However, when a correction method disclosed in Japanese Patent Laid-open Publication No. 2007-315897 is applied to a case where the measured object is measured by the scanning probe in a state where the measured object has been placed on a displacement table, there are instances where adequate correction cannot be performed.

SUMMARY OF THE INVENTION

The present invention provides a shape measuring apparatus and a shape measurement error correction method capable of making an adequate correction when performing measurement with a scanning probe while displacing a measured object placed on a displacement table.

A shape measuring apparatus according to the present invention includes a displacement table, a scanning probe, a ball tip displacement detector, a scale, and a calculator. The displacement table is capable of displacement in a coordinate axis direction and includes a measured object station designated for placement of a measured object. The scanning probe includes a stylus provided with a ball tip on a forefront end, the scanning probe bringing the ball tip into contact with the measured object positioned on the measured object station of the displacement table to perform a scanning measurement. The ball tip displacement detector is provided to a base end side of the stylus in the scanning probe, and detects displacement of the ball tip. The scale detects displacement of the displacement table in a coordinate axis direction. The calculator calculates a measured value using the displacement of the displacement table detected by the scale and the displacement of the ball tip detected by the ball tip displacement detector. The calculator performs a correction process on the coordinate axis direction displacement of the displacement table detected by the scale, the correction process being performed based on first frequency transfer characteristics from the scale to the measured object station. The calculator also performs a correction process on the corrected coordinate axis direction displacement of the displacement table based on second frequency transfer characteristics from the ball tip to the ball tip displacement detector.

The first and second frequency transfer characteristics are each estimated values.

The displacement table is capable of displacement in a plurality of coordinate axis directions. The first frequency transfer characteristics are measured as actual measurement values for each coordinate axis of the displacement table. The estimated value of the first frequency transfer characteristics is calculated as a frequency transfer function based on each of the actual measurement values.

A shape measurement error correction method according to the present invention includes detecting, using a ball tip displacement detector, displacement of a ball tip of a scanning probe performing scanning measurement by bringing the ball tip provided to a stylus into contact with a measured object; detecting, using a scale, displacement of a displacement table capable of displacement and having a measured object station designated for placement of the measured object; outputting, as a first corrected value, a value in which the displacement of the displacement table detected by the scale is corrected based on first frequency transfer characteristics from the scale to the measured object station; outputting, as a second corrected value, a value in which the first corrected value is corrected based on second frequency transfer characteristics from the ball tip to the ball tip displacement detector; and calculating a measured value by adding the second corrected value and the displacement of the ball tip detected by the ball tip displacement detector.

The first and second frequency transfer characteristics are each estimated values.

The displacement table is capable of displacement in a plurality of coordinate axis directions. The first frequency transfer characteristics are measured as actual measurement values for each coordinate axis of the displacement table. The estimated value of the first frequency transfer characteristics is calculated as a frequency transfer function based on each of the actual measurement values.

In addition, a value in which a design value indicating a shape of the measured object is subtracted from the displacement of the displacement table detected by the scale is corrected based on the first frequency transfer characteristics; the design value is added to the second corrected value which was corrected based on the second frequency transfer characteristics; and this summed value is added to the displacement of the ball tip detected by the ball tip displacement detector to calculate a measured value.

The second corrected value is a value in which correction is performed based on third frequency transfer characteristics from the ball tip to a stylus attachment, after which that corrected value is corrected based on fourth frequency transfer characteristics from the stylus attachment to the ball tip displacement detector.

According to the present invention, adequate correction can be made when performing measurement with a scanning probe while displacing a measured object placed on a displacement table.

The present invention is clarified by the following detailed description and the appended drawings. The appended drawings are referenced only to facilitate understanding and do not serve to limit the present invention.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

Figure 1:
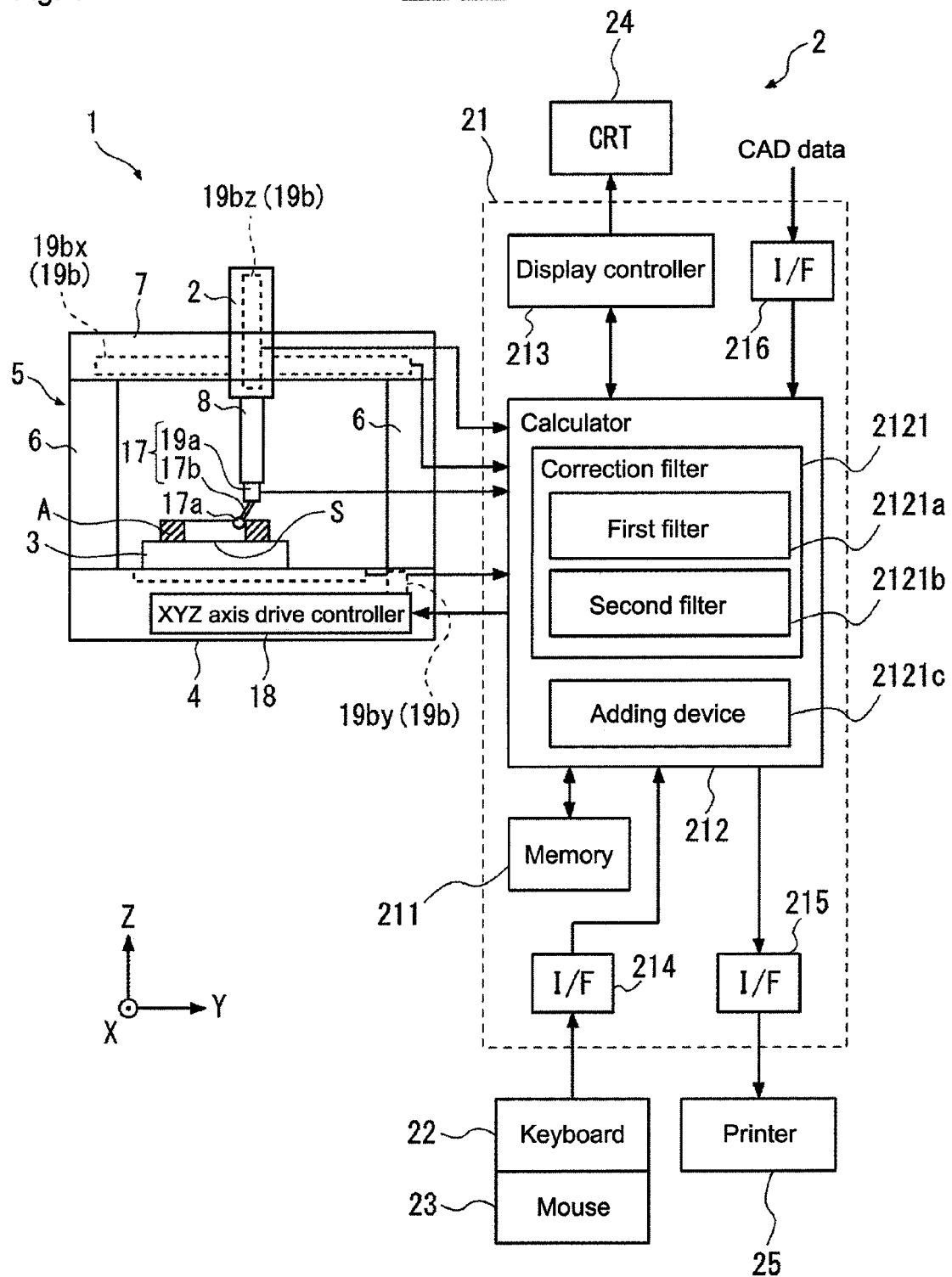
FIG. 1 is a schematic view of an embodiment of a shape measuring apparatus according to the present invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, embodiments of a shape measuring apparatus and a shape measurement error correction method according to the present invention are described with reference to the drawings. Identical reference numerals are assigned to identical elements in each of the plurality of drawings, and duplicative descriptions are omitted where necessary.

First Embodiment

Figure 8:
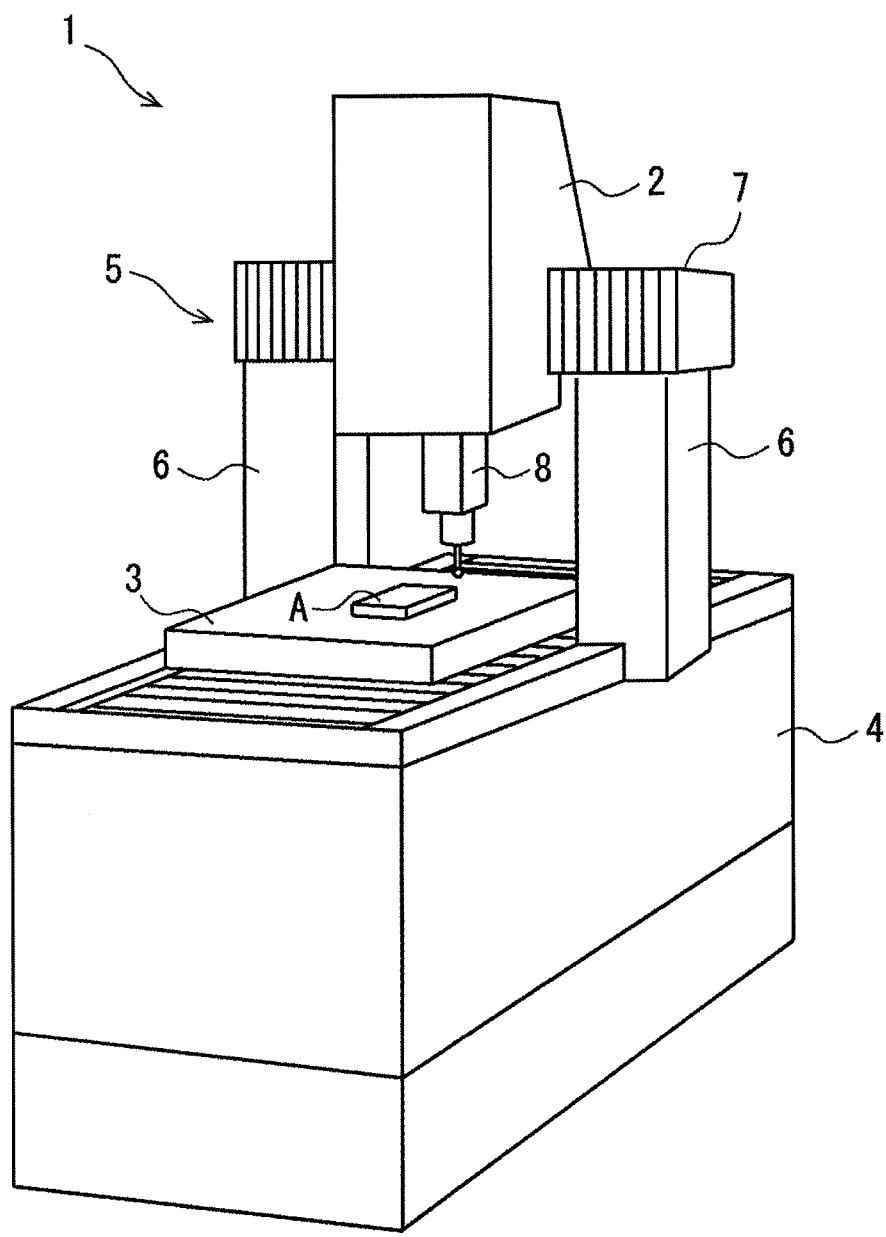
FIG. 8 is a perspective view of a coordinate measuring device to which the present embodiment is applied.

As shown in FIGS. 1 and 8, a shape measuring apparatus 100 is connected to a coordinate measuring device 1 and a computer 2 via a cable not shown in the drawings.

The coordinate measuring device 1 includes a stage 4 installed on a floor and a gate-shaped support frame 5 provided upright on the stage 4. The stage 4 includes a displacement table 3 capable of displacement in a Y axis direction. The support frame 5 includes a pair of support columns 6 fixated to the stage 4, and a beam 7 extending so as to bridge the support columns 6. Provided to the beam 7 is a column 2, which extends in a vertical direction and which is capable of displacement in an X direction along the beam 7, and a slider 8 moving up and down in the vertical direction (Z axis direction) is mounted on the column 2.

The displacement table 3 is driven in the Y axis direction by a Y axis drive mechanism (not shown in the drawings) extending in the Y axis direction. The column 2 is driven in the X axis direction by an X axis drive mechanism (not shown in the drawings) extending in the X axis direction. The slider 8 is driven in the Z axis direction by a Z axis drive mechanism (not shown in the drawings) extending in the Z axis direction. In addition, each servomotor is controlled by a pulse signal output from an XYZ axis drive controller 18.

The coordinate measuring device 1 includes a scale 19*b* for measuring an amount of displacement in each of the X, Y, and Z axis directions. The scale 19*b* is configured by a Y axis scale 19*by* for measuring an amount of Y axis direction displacement (change of position) of the displacement table 3; an X axis scale 19*bx* for measuring an amount of X axis direction displacement of the column 2; and a Z axis scale 19*bz* for measuring an amount of Z axis direction displacement of the slider 8.

A scanning probe 17 is attached to a forefront end of the slider 8. The scanning probe 17 includes a ball tip displacement detector 19*a* fixated to the forefront end of the slider 8, and a stylus 17*b* detachably attached at a base end to the ball tip displacement detector 19*a*. In addition, a ball tip 17*a* is provided to the forefront (or distal) end of the stylus 17*b*, the ball tip 17*a* making contact with a measured object A placed on a top surface of the displacement table 3.

The stylus 17*b* is freely attachable/detachable with respect to the ball tip displacement detector 19*a* using a screw or the like, and can be swapped out as necessary. Also, during measurement, the measured object A is fixated by a jig to a measured object station S, which is a portion designated for placement of the measured object A on the top surface side of the displacement table 3.

The ball tip 17*a* makes contact with the measured object A fixated to the measured object station S, which is located in a center on top of the displacement table 3, then remains in contact with the measured object in a state deflected from that reference position (neutral position) by a predetermined deflection amount. The ball tip displacement detector 19*a* installed in the scanning probe 17 outputs the amount of deflection (in each of the X, Y, and Z axis directions), and a computer 2 imports XYZ coordinate values (amount of shift from the reference position) of the ball tip 17*a*.

The computer 2 performs drive control of the coordinate measuring device 1 to import necessary measured values, and also executes computations necessary for computing a surface shape of the measured object A. The computer 2 includes a computer main body 21, a keyboard 22, a mouse 23, a CRT 24, and a printer 25. Generic versions of the keyboard 22, mouse 23, CRT 24, and printer 25 can be used, and so a detailed description of each is omitted. Details of the computer main body 21 are described hereafter.

The coordinate measuring device 1 controls displacement of the scanning probe 17 in each of the X, Y, and Z axis directions using the XYZ axis drive controller 18 controlling the servomotors; detects the amount of displacement in the X, Y, and Z axis directions using the scale 19*b*; and outputs a displacement pulse.

The scale 19*b* includes the X axis scale 19*bx*, the Y axis scale 19*by*, and the Z axis scale 19*bz*. In addition, detected displacement data for the ball tip 17*a* (an amount of shift for each of the XYZ axes output from the ball tip displacement detector 19*a*) and displacement data for each of the XYZ axes output from the scale 19*b* is output to a calculator 212, described hereafter. Moreover, the scale 19*b* is adjusted such that the reference position of the ball tip 17*a* is output for a time when no relative displacement occurs between the scale 19*b* and the ball tip 17*a* reference position.

The computer main body 21 of the computer 2 is primarily configured by, for example, an HDD, semiconductor memory, and the like. The computer main body 21 includes a memory 211, the calculator 212, a display controller 213, and interfaces (I/F) 214 to 216. The memory 211 stores input data. The calculator 212 is configured by a CPU, for example, drives the coordinate measuring device 1, and calculates a measured value. The display controller 213 controls an image displayed on the CRT 24. Furthermore, the memory 211 stores a surface shape measuring program driving the coordinate measuring device 1, as well as detected values detected in such measurement, design values of the measured object, and the like. The calculator 212 reads the surface shape measuring program from the memory 211 and measures the shape of the measured object.

The calculator 212 receives, via the interface 214, an operator's instruction data, which is input through the keyboard 22 and the mouse 23. In addition, the calculator 212 imports the detected ball tip displacement data and scale displacement data. Based on this input data, the operator's instruction data, and the program stored in the memory 211, the calculator 212 executes various processes such as displacement of the displacement table 3, support frame 5, and slider 8 using the XYZ axis drive controller 18; detecting the measured values of the measured object A; and correction of the measured values. The calculator 212 outputs to the printer 25, via the interface 215, the measured values calculated by the various processes. Moreover, the interface 216 is for converting CAD data of the measured object A supplied by an external CAD system or the like (not shown in the drawings) into a predetermined format and inputting the data to the computer main body 21.

Figure 2:
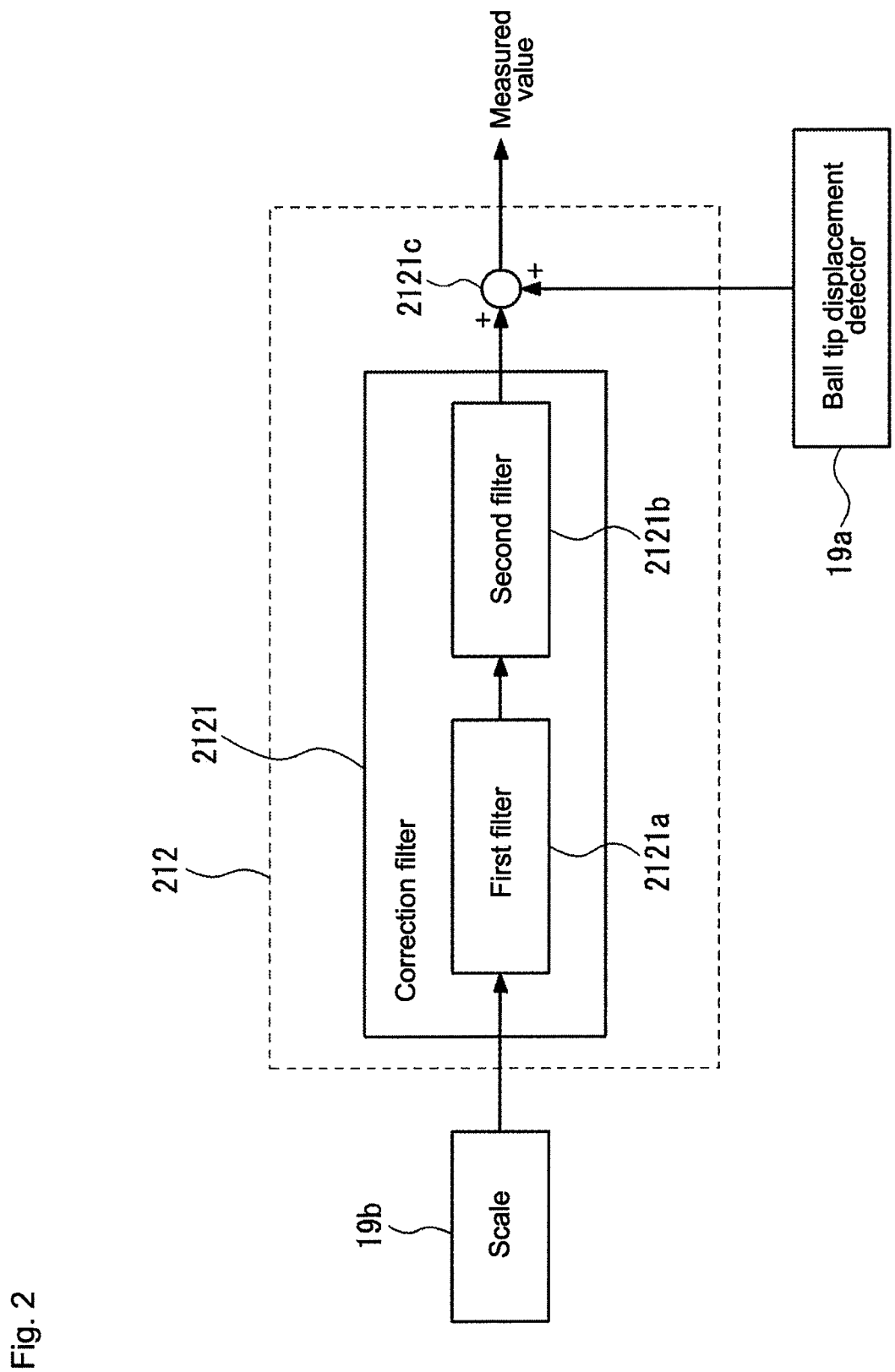
FIG. 2 is a block diagram of a calculator according to a first embodiment.
Figure 3:
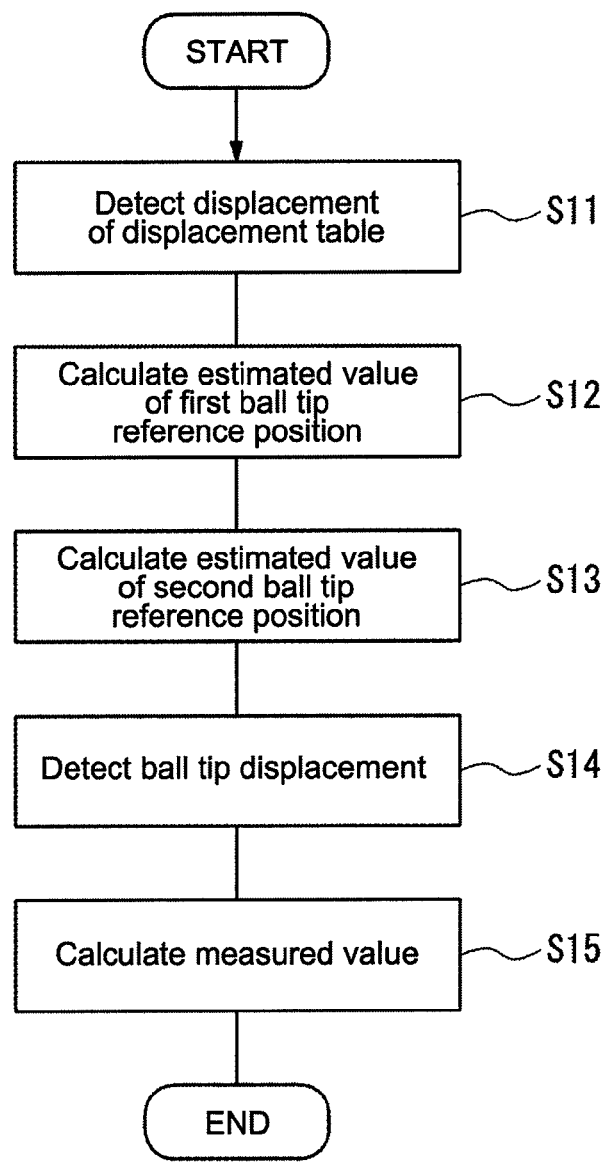
FIG. 3 is a block diagram of a shape measurement error correction process according to the first embodiment.

Next, with reference to FIGS. 2 and 3, a description is given of a functional configuration of the calculator 212 calculating the measured values of the measured object A, and of steps in calculating the measured values. FIG. 2 is a block diagram of controls for the calculator 212 and its peripherals. FIG. 3 is a flow chart illustrating a process of the calculator 212 calculating the measured values.

First, the scale 19*b* detects the change of position of the displacement table 3, the support frame 5, and the slider 8 (step S11), and inputs that change of position to the calculator 212. A correction filter 2121 in the calculator 212 includes a first filter 2121*a* and a second filter 2121*b*.

Based on the change of position of the scale 19*b*, the first filter 2121*a* calculates estimated values for a first ball tip reference position, which is the reference position (coordinates) of the ball tip 17*a* in a measurement space, and outputs the estimated values as first corrected values (step S12). For example, based on the change of position of the scale 19*b* that was actually measured, the first filter 2121*a* uses as a corrected value an estimated value Ge1(s), which is defined so as to approximate frequency transfer characteristics from the scale 19*b* to the measured object station S. The estimated value Ge1(s) expressed by a frequency transfer function is, for example, Formula 1 shown below.

[Formula 1]

$$Ge1(S) = \frac{\omega_{P1}^2(S^2 + 2\xi_{Z1}\omega_{Z1}S + \omega_{Z1}^2)}{\omega_{Z1}^2(S^2 + 2\xi_{p1}\omega_{p1}S + \omega_{p1}^2)} \quad (1)$$

Where s is a Laplace operator, $\omega_{Z1}$ is a zero angular frequency, $\omega_{P1}$ is a polar angular frequency, $\xi_{Z1}$ is a zero attenuation, and $\xi_{P1}$ is a polar attenuation. Moreover, "zero" refers to a value of s at a time when the estimated value Ge1(s) is 0. "Polar" refers to a value of s at a time when the estimated value Ge1(s) is ∞.

A method of estimating Ge1(s) is now described.

(Regarding Actual Y Axis Direction Measurement)

(1) A detector head of a linear scale (not shown in the drawings) is attached to the forefront end of the slider 8 of the coordinate measuring device 1 instead of the scanning probe 17, and a scale main body of the linear scale is placed in the measured object station S of the displacement table 3. At this point, the scale main body extends in the Y axis direction.

(2) The displacement table 3 is driven in the Y axis direction in the shape of a sine wave, for example, and this change of position is measured by both the Y axis scale 19*by* of the coordinate measuring device 1 and the linear scale.

(3) The estimated value Ge1(s) of the Y axis direction is obtained by approximating an actual measurement value of frequency transfer characteristics obtained from actual measurement values of both the Y axis scale 19*by* and the linear scale, using Formula 1 for example.

(Regarding Actual X Axis Direction Measurement)

Similarly, in a state where the detector head of the linear scale (not shown in the drawings) is attached to the forefront end of the slider 8 of the coordinate measuring device 1, the scale main body of the linear scale is placed in the measured object station S of the displacement table 3. At this point, the scale main body extends in the X axis direction. Next, the column 2 is driven along the beam 7 in the X axis direction in the shape of a sine wave, for example, and this change of position is measured by both the X axis scale 19*bx* of the coordinate measuring device 1 and the linear scale. Then, the estimated value Ge1(s) of the X axis direction is obtained by approximating an actual measurement value of frequency transfer characteristics obtained from actual measurement values of both the X axis scale 19*bx* and the linear scale, using Formula 1 for example.

(Regarding Actual Z Axis Direction Measurement)

Similarly, in a state where the detector head of the linear scale (not shown in the drawings) is attached to the forefront end of the slider 8 of the coordinate measuring device 1, the scale main body of the linear scale is placed in the measured object station S of the displacement table 3. At this point, the scale main body extends in the Z axis direction. Next, the slider 8 is driven in the Z axis direction in the shape of a sine wave, for example, and this change of position is measured by both the Z axis scale 19*bz* of the coordinate measuring device 1 and the linear scale. Then, the estimated value Ge1(s) for the Z axis direction is obtained by approximating an actual measurement value of frequency transfer characteristics obtained from actual measurement values of both the Z axis scale 19*bz* and the linear scale, using Formula 1 for example.

Based on the first ball tip reference position estimated value (first corrected value) calculated by the first filter 2121*a*, the second filter 2121*b* calculates a second ball tip reference position estimated value (step S13). Based on the first ball tip reference position estimated value, the second filter 2121*b* uses as a corrected value an estimated value Ge2(s) defined so as to approximate frequency transfer characteristics from the ball tip 17*a* of the scanning probe 17 to the ball tip displacement detector 19*a*. Thereby, the second ball tip reference position estimated value (second corrected value) may be obtained.

The estimated value Ge2(s) expressed by a frequency transfer function is, for example, Formula 2 shown below.

[Formula 2]

$$Ge2(S) = \frac{\omega_{P2}^2 (S^2 + 2\xi_{Z2}\omega_{Z2} S + \omega_{Z2}^2)}{\omega_{Z2}^2 (S^2 + 2\xi_{p2}\omega_{p2} S + \omega_{p2}^2)}. \quad (2)$$

Where s is a Laplace operator, $\omega_{Z2}$ is a zero angular frequency, $\omega_{Z2}$ is a polar angular frequency, $\xi_{Z2}$ is a zero attenuation, and $\xi_{P2}$ is a polar attenuation. Moreover, "zero" refers to a value of s at a time when the estimated value Ge2(s) is 0. "Polar" refers to a value of s at a time when the estimated value Ge2(s) is ∞.

A method of estimating Ge2(s) is now described.

Figure 4:
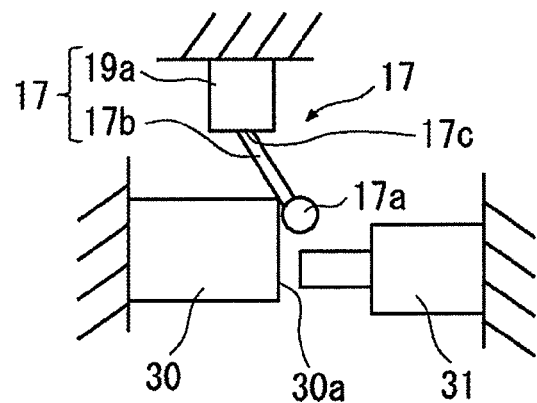
FIG. 4 is a schematic view of an estimated value measuring apparatus according to the first embodiment.

(1) As shown in FIG. 4, the ball tip 17*a* of the scanning probe 17 is brought into contact with a displacement surface 30*a* of a displacement generating mechanism 30, and is left in a state deflected by a predetermined amount. In addition, displacement of the displacement surface 30*a* is measured by a displacement sensor 31.

(2) Displacement of the displacement surface 30*a* causes the displacement generating mechanism 30 to generate a sine-shaped wave, and this displacement is measured by the displacement sensor 31, at which point displacement in a direction (X, Y, or Z axis direction) perpendicular to the displacement surface 30*a* is measured by the ball tip displacement detector 19*a*.

(3) The estimated value Ge2(s) is obtained by approximating an actual measurement value of frequency transfer characteristics obtained from actual measurement values of both the ball tip displacement detector 19*a* and the displacement sensor 31, using Formula 2 for example.

The second ball tip reference position estimated value (second corrected value) obtained in this way is output to an adding device 2121*c* as the second corrected value, as shown in FIGS. 2 and 3. Meanwhile, the ball tip displacement detector 19*a* detects a ball tip displacement value indicating a change in position of the ball tip 17*a* (amount of shift of the ball tip 17*a* from the reference position) (step S14), and inputs this to the adding device 2121*c*. Then, the adding device 2121*c* adds the second corrected value and the ball tip displacement value to calculate the measured value, and outputs the calculated measured value (step S15).

In this way, an effect due to frequency transfer characteristics from the scale 19*b* to the measured object station S is eliminated by the first filter 2121*a*. An effect due to frequency transfer characteristics from the ball tip 17*a* of the scanning probe 17 to the ball tip displacement detector 19*a* is eliminated by the second filter 2121*b*.

The scale 19*b* in the preceding description includes the X axis scale 19*bx*, the Y axis scale 19*by*, and the Z axis scale 19*bz*; however, the frequency transfer characteristics from the X axis scale 19*bx* to the measured object station S, the frequency transfer characteristics from the Y axis scale 19*by* to the measured object station S, and the frequency transfer characteristics from the Z axis scale 19*bz* to the measured object station S do not necessarily match one another. Therefore, the estimated values expressed by the frequency transfer functions are typically different, and are calculated for each. In addition, even with respect to the frequency transfer characteristics from the ball tip 17*a* to the ball tip displacement detector 19*a*, the characteristics for each coordinate axis direction X, Y, and Z do not necessarily match one another, and therefore the estimated values expressed by the frequency transfer functions are typically different and are calculated for each.

As noted above, when obtaining the measured values, the correction filter 2121 (for which the frequency transfer functions are established) is applied in the present embodiment, the function being obtained from the frequency transfer characteristics (relative displacement characteristics) from the scale 19*b* to the measured object station S and from the ball tip 17*a* of the scanning probe 17 to the ball tip displacement detector 19*a*. Accordingly, the position of the ball tip 17a can be obtained with greater accuracy. Thus, an influence of quadrant projection, lost motion, transient phenomena, or resonance phenomena, for example, can be canceled out to find the measured values, enabling measurement of the measured object A (such as a ring gauge) to be performed with a high degree of accuracy.

Second Embodiment

Next, a shape measuring apparatus 200 according to a second embodiment is described. An overall configuration of the shape measuring apparatus 200 is equivalent to that of the shape measuring apparatus 100 according to the first embodiment and shown in FIG. 1. However, the shape measuring apparatus 200 has a configuration in which the calculator 212 according to the first embodiment (see FIG. 2) is replaced by a calculator 222 (see FIG. 5). The calculator 222 is described hereafter.

Figure 5:
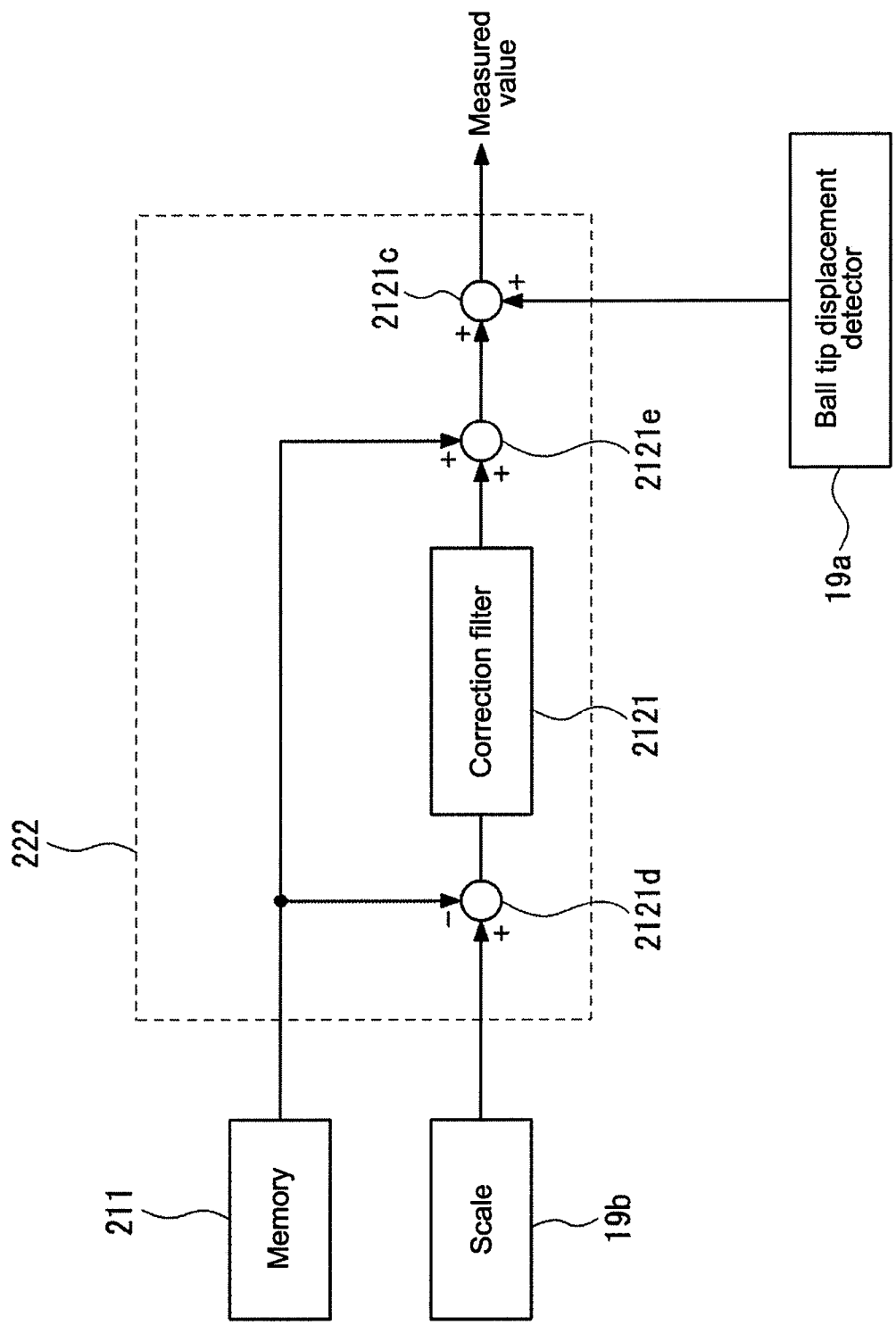
FIG. 5 is a block diagram of a calculator according to a second embodiment.

As shown in FIG. 5, the calculator 222 has a configuration in which a subtracting device 2121d and an adding device 2121e are added to the calculator 212 according to the first embodiment.

Figure 6:
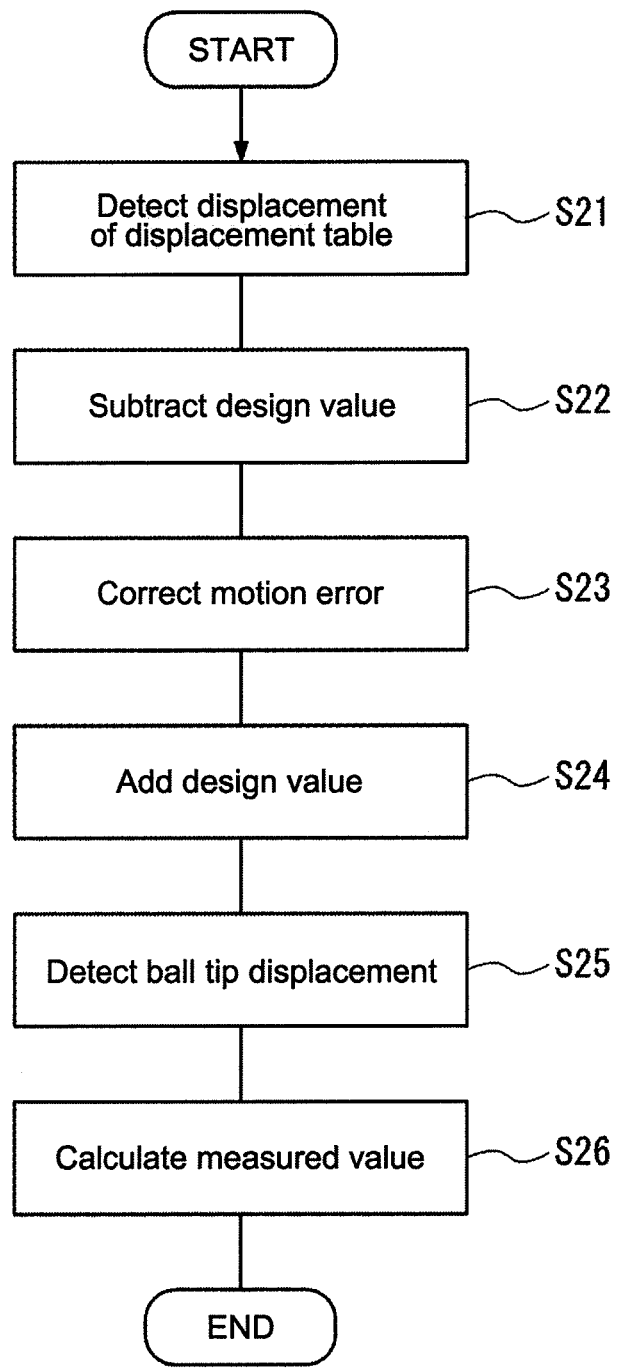
FIG. 6 is a block diagram of a shape measurement error correction process according to the second embodiment.

As shown in FIGS. 5 and 6, and similarly to the first embodiment, the scale 19b detects displacement (step S21), which is output to the calculator 222.

Next, the calculator 222 retrieves design values (shape data) for the measured object A that have been stored ahead of time in the memory 211. Then, the subtracting device 2121d subtracts the design value from the displacement output from the scale 19b and calculates a motion error (step S22).

Subsequently, in the correction filter 2121 having the first filter 2121a and the second filter 2121b, the calculator 222 estimates an error in the reference position of the ball tip 17a by executing a process to correct an effect of the motion error on the reference position of the ball tip 17a, then outputs the second corrected value in a manner similar to that of the first embodiment (step S23).

Next, the adding device 2121e adds the design value retrieved from the memory 211 to the corrected motion error of the ball tip 17a reference position (i.e., an effect the motion error exerts on the reference position of the tip, referred to as a second corrected value), and calculates an estimated value of the reference position of the ball tip 17a after motion error correction (step S24).

Then the ball tip displacement detector 19a detects displacement data for the ball tip 17a (step S25), and calculates the measured values based on the displacement data for the ball tip 17a as well as the estimated value for the reference position of the ball tip 17a after motion error correction (step S26).

Figure 7:
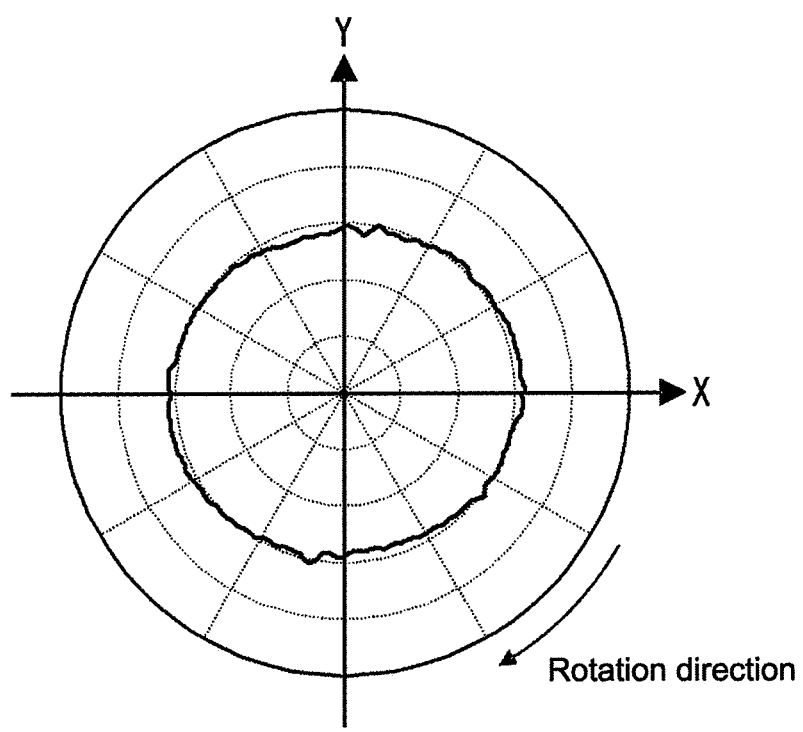
FIG. 7 illustrates simulation results according to the second embodiment.
Figure 9:
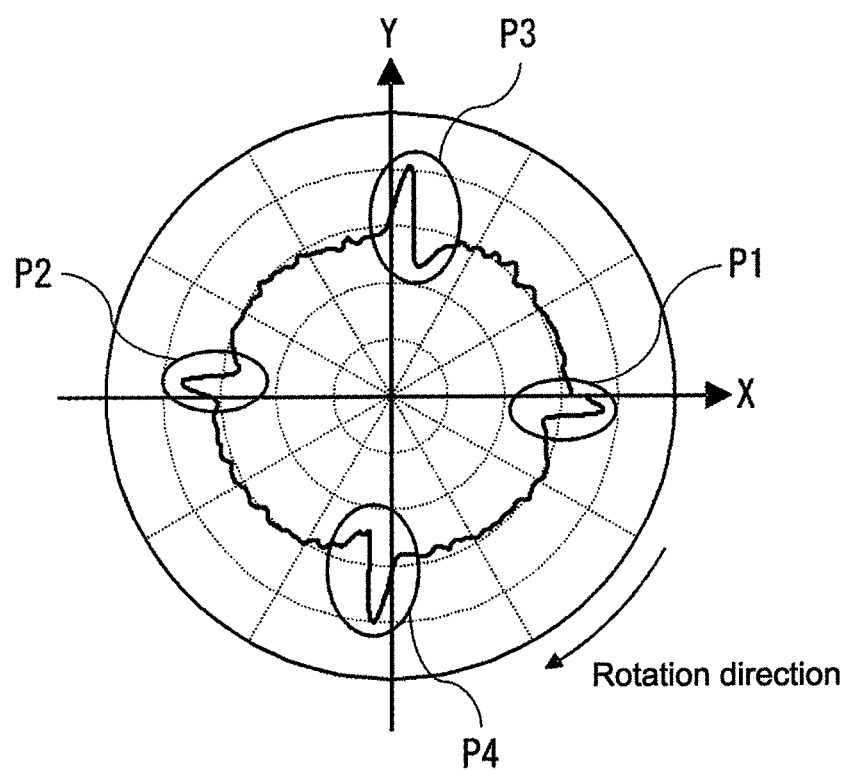
FIG. 9 illustrates conventional simulation results.

As shown in FIG. 7, when simulation results of the measured results according to the second embodiment are consulted, as compared to conventional simulation results (see FIG. 9), one can see that peak-shaped measurement errors are eliminated in border region P1 between a first quadrant and a fourth quadrant, as well as in border region P2 between a second quadrant and a third quadrant. Similarly, one can see that peak-shaped measurement errors are eliminated in border region P3 between the first quadrant and the second quadrant, as well as in border region P4 between the third quadrant and the fourth quadrant.

Herein, in the case of a general measurement, for example measuring a ring gauge of $\phi$ 100 mm, the motion error with respect to the design value of 100 mm is several hundred µm, meaning that these values differ by an order of $10^3$. Meanwhile, as an example, single-precision floating point operation accuracy of the calculator 212, which includes the first filter 2121a and the second filter 2121b, is normally around $10^7$ ($1.7 \times 10^7 \approx 24$ bit). In this way, the motion error relative to the design values is extremely small. Therefore, by separating value regions according to error in order to perform the calculation, as in the second embodiment, a dynamic range of calculations for the first filter 2121a and the second filter 2121b can be effectively employed. Accordingly, more highly accurate correction can be achieved.

In addition, even when the correction filter 2121 is employed for values in which an estimated value for the shape of the measured object A (e.g., a circle of the least square for the scale 19b) is subtracted from the value detected by the scale 19b, a similar effect can be obtained. This method is effective for autonomous scanning measurement (scanning measurement based on motion trajectories constantly, autonomously generated according to measurement conditions).

The present invention is not limited to the above-described embodiments, and may include various modifications, such as the following, not deviating from the scope of the present invention.

For example, as shown in Formula 3, the second filter 2121b may be separated into a third filter and a fourth filter. In this case, the estimated value Ge2(s) described above is separated into an estimated value Ge3(s) for frequency transfer characteristics from the ball tip 17a of the stylus 17b to a stylus attachment 17c (see FIG. 4) and an estimated value Ge4(s) for frequency transfer characteristics from the stylus attachment 17c to the ball tip displacement detector 19a. In addition, the second corrected value is a value in which correction is performed based on the third frequency transfer characteristics from the ball tip 17a to the stylus attachment 17c, after which that corrected value is corrected based on the fourth frequency transfer characteristics from the stylus attachment 17c to the ball tip displacement detector 19a. Accordingly, the stylus 17b can be swapped out, and simply by selecting the estimated value Ge4(s) corresponding to the mounted stylus 17b, peak-shaped measurement errors can be adequately eliminated.

(Formula 3)

$$G2(S) = G3(S) \cdot G4(S) \qquad (3)$$

In the embodiments described above, a case of scanning measurement of a circle was described. However, the present invention is not limited to this, and can also be applied to scanning measurement of a free-form surface, for example.

In addition, the displacement table 3 can only be displaced in the Y axis direction in the embodiments described above; however, the displacement table 3 can also be displaced in the X and/or Z axis directions, as well. In such a case, the stage 4 includes a scale extending in each of the X and/or Z axis directions.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A shape measuring apparatus comprising:
a displacement table configured to be displaced in a coordinate axis direction, the displacement table comprising a measured object station where a measured object is to be placed;
a scanning probe comprising a stylus having a ball tip on a distal end thereof, the scanning probe configured to bring the ball tip into contact with the measured object positioned on the measured object station of the displacement table to perform a scanning measurement;
a ball tip displacement detector located at base end side of the stylus in the scanning probe, the ball tip displacement detector configured to detect displacement of the ball tip;
a scale configured to detect displacement of the displacement table in a coordinate axis direction; and
a calculator configured to calculate a measured value using the displacement of the displacement table detected by the scale and the displacement of the ball tip detected by the ball tip displacement detector, wherein:
the calculator is further configured to perform a correction process on the coordinate axis direction displacement of the displacement table detected by the scale, the correction process being performed based on first frequency transfer characteristics from the scale to the measured object station, and
the calculator is further configured to perform a correction process on the corrected coordinate axis direction displacement of the displacement table based on second frequency transfer characteristics from the ball tip to the ball tip displacement detector.

2. The shape measuring apparatus according to claim 1, wherein the first and second frequency transfer characteristics are each estimated values.

3. The shape measuring apparatus according to claim 2, wherein:
the displacement table is configured to be displaced in a plurality of coordinate axis directions,
the first frequency transfer characteristics are measured as actual measurement values for each coordinate axis of the displacement table, and
the estimated value of the first frequency transfer characteristics is calculated as a frequency transfer function based on each of the actual measurement values.

4. A shape measurement error correction method comprising:
detecting, using a ball tip displacement detector, displacement of a ball tip of a scanning probe performing scanning measurement by bringing the ball tip provided to a stylus into contact with a measured object;
detecting, using a scale, displacement of a displacement table displaceable in a coordinate axis direction and having a measured object station designated for placement of the measured object;
outputting, as a first corrected value, a value in which the displacement of the displacement table detected by the scale is corrected, based on first frequency transfer characteristics from the scale to the measured object station;
outputting, as a second corrected value, a value in which the first corrected value is corrected, based on second frequency transfer characteristics from the ball tip to the ball tip displacement detector; and
calculating a measured value by adding the second corrected value and the displacement of the ball tip detected by the ball tip displacement detector.

5. The shape measurement error correction method according to claim 4, wherein the first and second frequency transfer characteristics are each estimated values.

6. The shape measurement error correction method according to claim 5, wherein:
the displacement table displaceable in a plurality of coordinate axis directions,
the first frequency transfer characteristics are measured as actual measurement values for each coordinate axis of the displacement table, and
the estimated value of the first frequency transfer characteristics is calculated as a frequency transfer function based on each of the actual measurement values.

7. The shape measurement error correction method according to claim 4, wherein a value in which a design value indicating a shape of the measured object is subtracted from the displacement of the displacement table detected by the scale is corrected based on the first frequency transfer characteristics;
the design value is added to the second corrected value; and
the second corrected value is added to the displacement of the ball tip detected by the ball tip displacement detector, and a measured value is calculated.

8. The shape measurement error correction method according to claim 5, wherein a value in which a design value indicating a shape of the measured object is subtracted from the displacement of the displacement table detected by the scale is corrected based on the first frequency transfer characteristics;
the design value is added to the second corrected value; and
the second corrected value is added to the displacement of the ball tip detected by the ball tip displacement detector, and a measured value is calculated.

9. The shape measurement error correction method according to claim 6, wherein a value in which a design value indicating a shape of the measured object is subtracted from the displacement of the displacement table detected by the scale is corrected based on the first frequency transfer characteristics;
the design value is added to the second corrected value; and
the second corrected value is added to the displacement of the ball tip detected by the ball tip displacement detector, and a measured value is calculated.

10. The shape measurement error correction method according to claim 4, wherein the second corrected value is a value in which correction is performed based on third frequency transfer characteristics from the ball tip to a stylus attachment, after which the value after the correction is further corrected based on fourth frequency transfer characteristics from the stylus attachment to the ball tip displacement detector.

11. The shape measurement error correction method according to claim 5, wherein the second corrected value is a value in which correction is performed based on third frequency transfer characteristics from the ball tip to a stylus attachment, after which the value after the correction is further corrected based on fourth frequency transfer characteristics from the stylus attachment to the ball tip displacement detector.

12. The shape measurement error correction method according to claim 6, wherein the second corrected value is a value in which correction is performed based on third frequency transfer characteristics from the ball tip to a stylus attachment, after which the value after the correction is further corrected based on fourth frequency transfer characteristics from the stylus attachment to the ball tip displacement detector.

13. The shape measurement error correction method according to claim 7, wherein the second corrected value is a value in which correction is performed based on third frequency transfer characteristics from the ball tip to a stylus attachment, after which the value after the correction is further corrected based on fourth frequency transfer characteristics from the stylus attachment to the ball tip displacement detector.

14. The shape measurement error correction method according to claim 8, wherein the second corrected value is a value in which correction is performed based on third frequency transfer characteristics from the ball tip to a stylus attachment, after which the value after the correction is further corrected based on fourth frequency transfer characteristics from the stylus attachment to the ball tip displacement detector.

15. The shape measurement error correction method according to claim 9, wherein the second corrected value is a value in which correction is performed based on third frequency transfer characteristics from the ball tip to a stylus attachment, after which the value after the correction is further corrected based on fourth frequency transfer characteristics from the stylus attachment to the ball tip displacement detector.

* * * * *